United States Patent Office 3,274,171
Patented Sept. 20, 1966

---

3,274,171
MONOAZO DYESTUFFS CONTAINING A
BENZOTHIAZOLE NUCLEUS
Norman L. Anderson, Hamburg, and Alvin C. Litke,
Buffalo, N.Y., assignors to Allied Chemical Corporation, New York, N.Y., a corporation of New York
No Drawing. Filed Apr. 29, 1963, Ser. No. 276,179
6 Claims. (Cl. 260—158)

This invention relates to monoazo dyestuffs containing the benzothiazole nucleus. More particularly it relates to the novel greenish yellow dyestuffs having the general formula in which the free sulfonic acid form is shown:

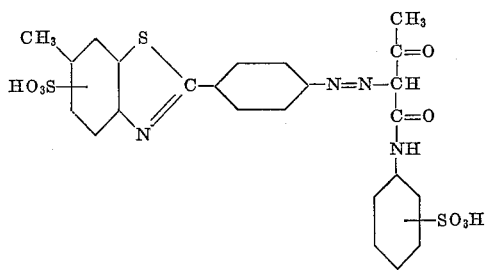

and the preparation thereof.

Yellow dyestuffs with a greenish tone dye paper shades of commercially desirable brightness. On the other hand reddish-yellow dyes, many of which are known to the art, often afford dull shades on paper.

Desirably, dyes for paper should possess the property of complete dischargeability when treated with bleaching agents, e.g. sodium hypochlorite, so that wastes from colored paper manufacturing can be completely discolored, thereby permitting wastes of several colors to be combined and reused.

Moreover, dyes for paper should be capable, when used in paper making machines of producing colored stock having substantially no "color two-sideness," i.e. having substantial uniformity of shade on both sides of the sheet. As further desirable features, paper dyeings should possess relatively good fastness to light and wet processing and should not undergo substantial alteration of tone on fading. Since a considerable amount of paper stock used in the trade is alkaline in nature, paper dyes should be resistant to attack by alkali.

Relatively few dyestuffs known to the art and particularly greenish yellow dyes possess all of the foregoing properties.

The novel compounds of our invention in the free sulfonic acid form correspond to the formula

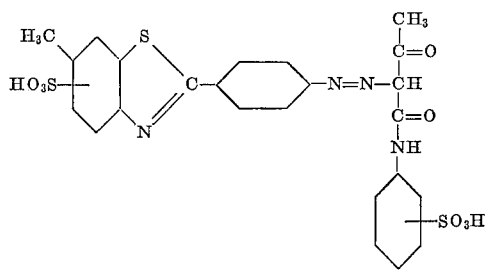

These novel compounds can be prepared by diazotizing a 2-(4'-aminophenyl)-6-methylbenzothiazole monosulfonic acid of the formula

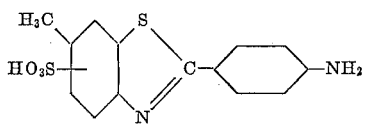

and coupling the resulting diazonium salt with an acetoacetanilide monosulfonic acid of the formula

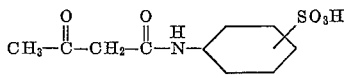

in an alkaline medium. The resulting dyestuff is precipitated from solution and is separated from its mother liquor in any convenient manner, as for example, by filtration. The dyestuffs prepared in this manner are low cost, they dye paper pulp and stock in bright yellow shades of a desirable greenish tone but surprisingly are relatively non-substantive to cotton. Paper dyed with the novel compounds of the present invention is distinguished by complete dischargeability when treated with bleaching agents, good fastness to light and wet processing, ability to fade without substantial alteration of tone, and resistance to attack by alkali.

The novel dyes of this invention, moreover, can be employed in paper making machines to produce dyed stock with substantial uniformity of shade on both sides of the sheet.

In preparing the novel dyestuffs of our invention, typical 2-(4'-aminophenyl)-6-methylbenzothiazole monosulfonic acids which can be used to provide the diazo intermediate include 2-(4'-aminophenyl)-6-methylbenzothiazole-5-sulfonic
  acid,
2-(4'-aminophenyl)-6-methylbenzothiazole-7-sulfonic
  acid.

Preferably we employ 2-(4'-aminophenyl)-6-methylbenzothiazole-7-sulfonic acid (which as usually prepared contains a small amount of the isomeric 5-sulfonic acid, see Color Index, second edition, vol. III, p. 3050, note under 13920) which can be obtained by sulfonating 2-(4'-aminophenyl) - 6 - methylbenzothiazole, i.e. dehydrothio-p-toluidine, with fuming sulfuric acid (Berichte 22, 971 (1889)).

Typical acetoacetanilide monosulfonic acids which can be used as the coupling component include N-acetoacetylmetanilic acid,
N-acetoacetylsulfanilic acid.

The above compounds can be prepared as described in U.S. Patent 2,328,358. Preferably N-acetoacetylsulfanilic acid is used as coupling component.

The diazotization of the 2-(4'-aminophenyl)-6-methylbenzothiazole sulfonic acid and the subsequent coupling reaction can be carried out in conventional fashion. Preferably, the 2-(4'-aminophenyl)-6-methylbenzothiazole sulfonic acid is treated with activated charcoal in water and filtered, before diazotization since it has been found that such a treatment aids in the preparation of dyestuffs which yield cleaner shades on paper. According to a preferred mode of operation, the diazotization is accomplished by charging solid sodium nitrite to an aqueous alkaline solution of the amine and gradually adding the resulting solution to an agitated mixture of ice, water and mineral acid. The diazonium salt solution is coupled with the acetoacetanilide monosulfonic acid in a strongly alkaline medium. When coupling is completed, usually after 10 to 24 hours, the product is isolated in a conventional manner, as by salting out and filtering the precipitated color body from the mother liquor.

The following examples illustrate the instant invention, but it is to be understood that the invention is not to be limited by the specific details thereof and that changes can be made without departing from the spirit or scope of the invention. The temperatures are given in degrees centigrade and parts and percentages unless otherwise noted are by weight.

EXAMPLE I

An aqueous paste (140 parts) containing 124 parts (0.4 mole) of 2-(4'-aminophenyl)-6-methylbenzothiazole 7-sulfonic acid, is charged under agitation to 2800 parts of water. The mixture is made alkaline by addition of 45.7 parts of an aqueous solution (50° Bé.) of sodium hydroxide. Activated carbon (15 parts) and diatomaceous silica (15 parts) are charged and the mixture is filtered. Sodium nitrite (28.5 parts) is dissolved in the clarified filtrate and the solution obtained is added gradually, during one hour, to an agitated mixture at 10°–15° of 400 parts of ice and 278 parts of an aqueous solution (20° Bé.) of hydrochloric acid. On completion of the addition, the mixture is agitated for one hour and then charged, during one hour, to an agitated mixture at 0°–5° of 1600 parts of water, 200 parts of ice, 116.8 parts (0.4 mole) of N-acetoacetyl sodium sulfanilate, and 120 parts of sodium carbonate. The alkaline coupling mixture is agitated without temperature control for 16 hours, and then heated to 70°. Sodium chloride (700 parts) is charged to the mixture, which then is cooled and agitated to 30°, and filtered. The filter cake weighs 365 parts after drying at 70°–80°. The color, when ground, possesses excellent solubility in water and dyes paper from an aqueous dyebath in bright greenish yellow shades of good fastness to light and wet processing. The product exhibits little substantivity for cotton and has the formula:

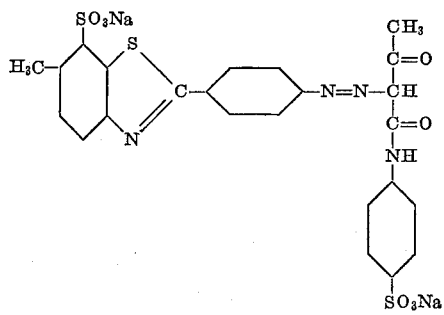

EXAMPLE II

A. Paper dyeing

A stock solution of the dyestuff of Example I is prepared as follows:

To 500 parts of boiling water, 0.750 part of dye are added and the mixture agitated to the boil until a complete solution is obtained.

10 parts of this stock solution is agitated for 10 minutes with 250 parts (by volume) of bleached sulfite pulp containing 3 parts of pulp (dry weight). Thereafter 4 parts (by volume) of 3% starch size and a like amount of 10% alum solution are added. The mixture is agitated for 20 minutes, diluted to 2000 parts (by volume) and finished into paper in a conventional manner. The paper is dyed yellow shades appreciably greener and brighter than paper dyed in like manner with Color Index Direct Yellow 5.

B. Bleachability

A paper strip (¾" x 4") dyed as above with the dyestuff of Example I is completely immersed in 50 parts (by volume) aqueous sodium hypochlorite (5.25% solution) for 10 minutes. The color is completely discharged from the strip, indicating the susceptibility of the dyestuff to the decolorizing action of bleaching agents.

EXAMPLE III

Bleached sulfite pulp is dyed with the dyestuff of Example I (3 lbs. of color per ton of pulp) in a paper making machine operating at 100 feet per minute with 1½% size and at a water-whiteness pH of 5.3–5.5 obtained with alum. The paper stock is dyed with a good uniformity of greenish yellow shade on both sides of the sheet.

We claim:

1. A monoazo dyestuff of the formula

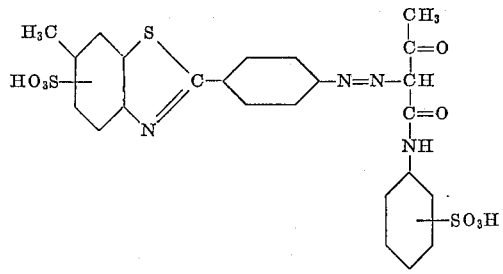

2. A monoazo dyestuff of the formula

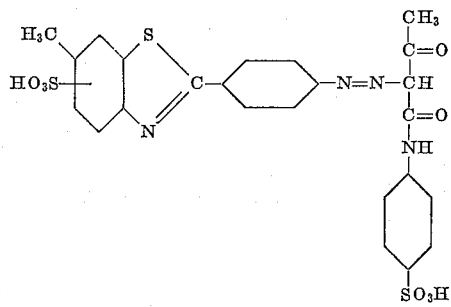

3. A monoazo dyestuff of the formula

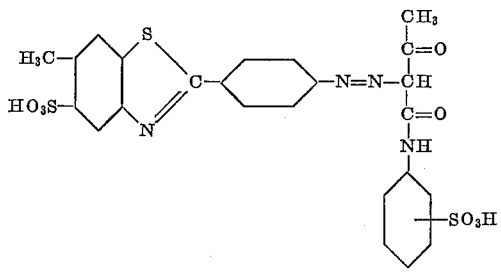

4. A monoazo dyestuff of the formula:

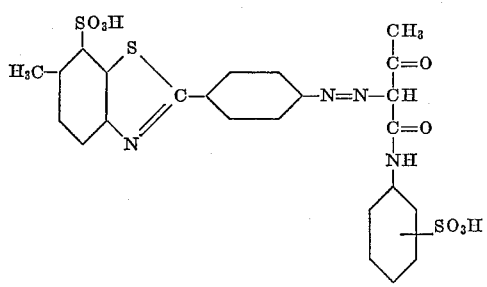

5. A monoazo dyestuff having the formula:

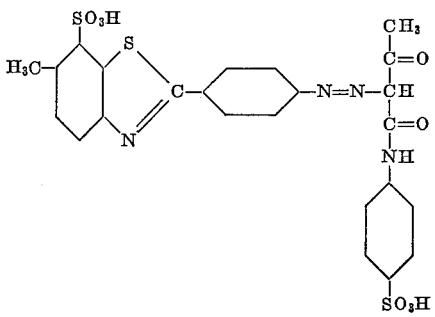

6. A monoazo dyestuff which comprises a mixture having as a major portion 4-(6'-methyl-7'-sulfo-benzothiazole)-phenylazo-acetoacetsulfoanilide and as a minor portion 4-(6'-methyl-5'-sulfo-benzothiazole)-phenyl-azo-acetoacetsulfoanilide.

References Cited by the Examiner
UNITED STATES PATENTS

| | | | |
|---|---|---|---|
| 1,159,386 | 11/1915 | Huismann | 260—158 |
| 1,833,269 | 11/1931 | Stusser | 260—158 |
| 2,234,648 | 3/1941 | Lubs et al. | 8—7 |
| 2,420,336 | 5/1947 | Orchard | 8—7 |
| 2,657,202 | 10/1953 | Moser | 260—158 |

CHARLES B. PARKER, *Primary Examiner.*

R. J. FINNEGAN, DONALD M. PAPUGA,
*Assistant Examiners.*